June 10, 1930. H. S. JANDUS 1,763,587
BUMPER
Filed March 25, 1929 2 Sheets-Sheet 2
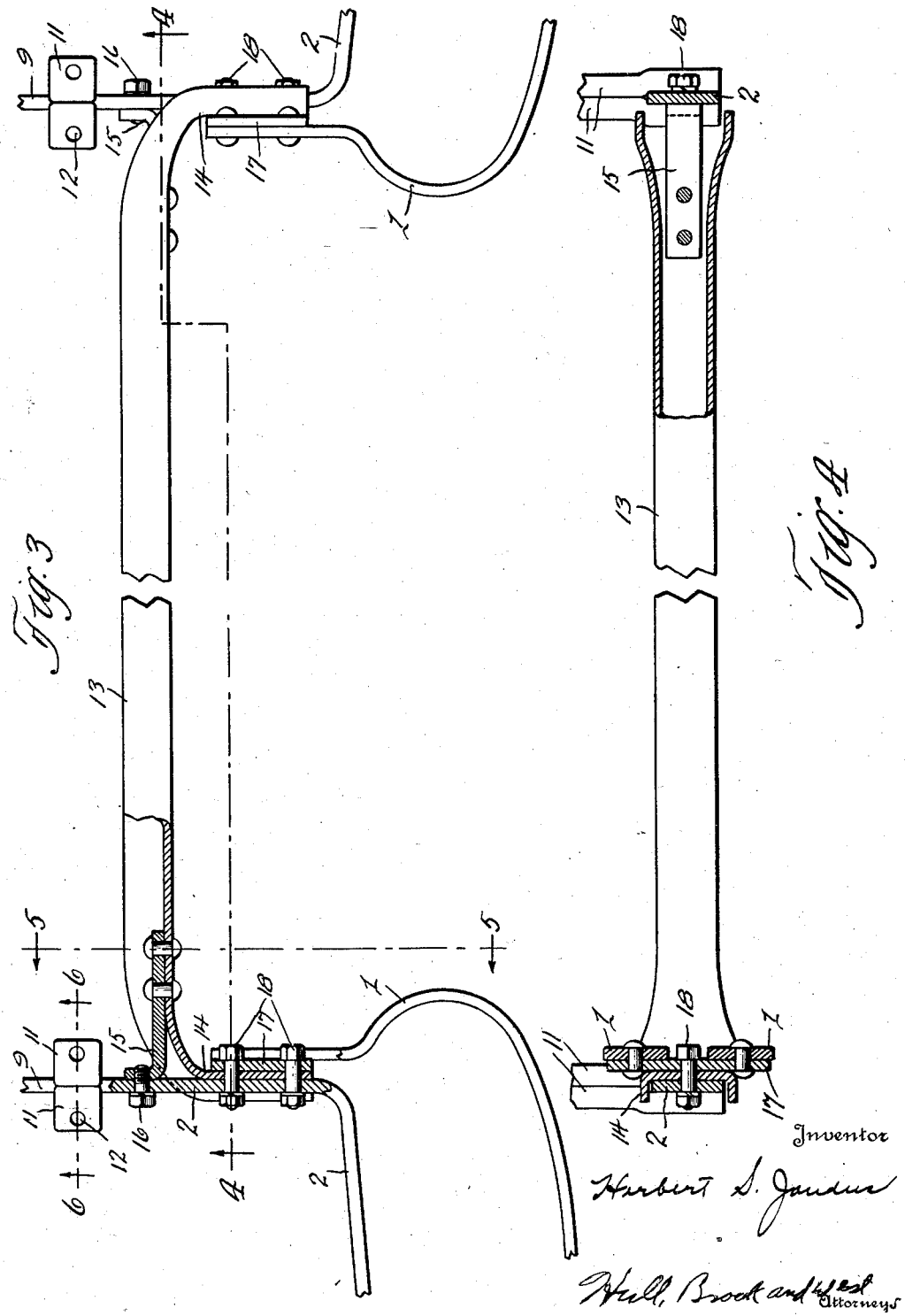
Inventor
Herbert S. Jandus
Hull, Brock and West
Attorneys Patented June 10, 1930

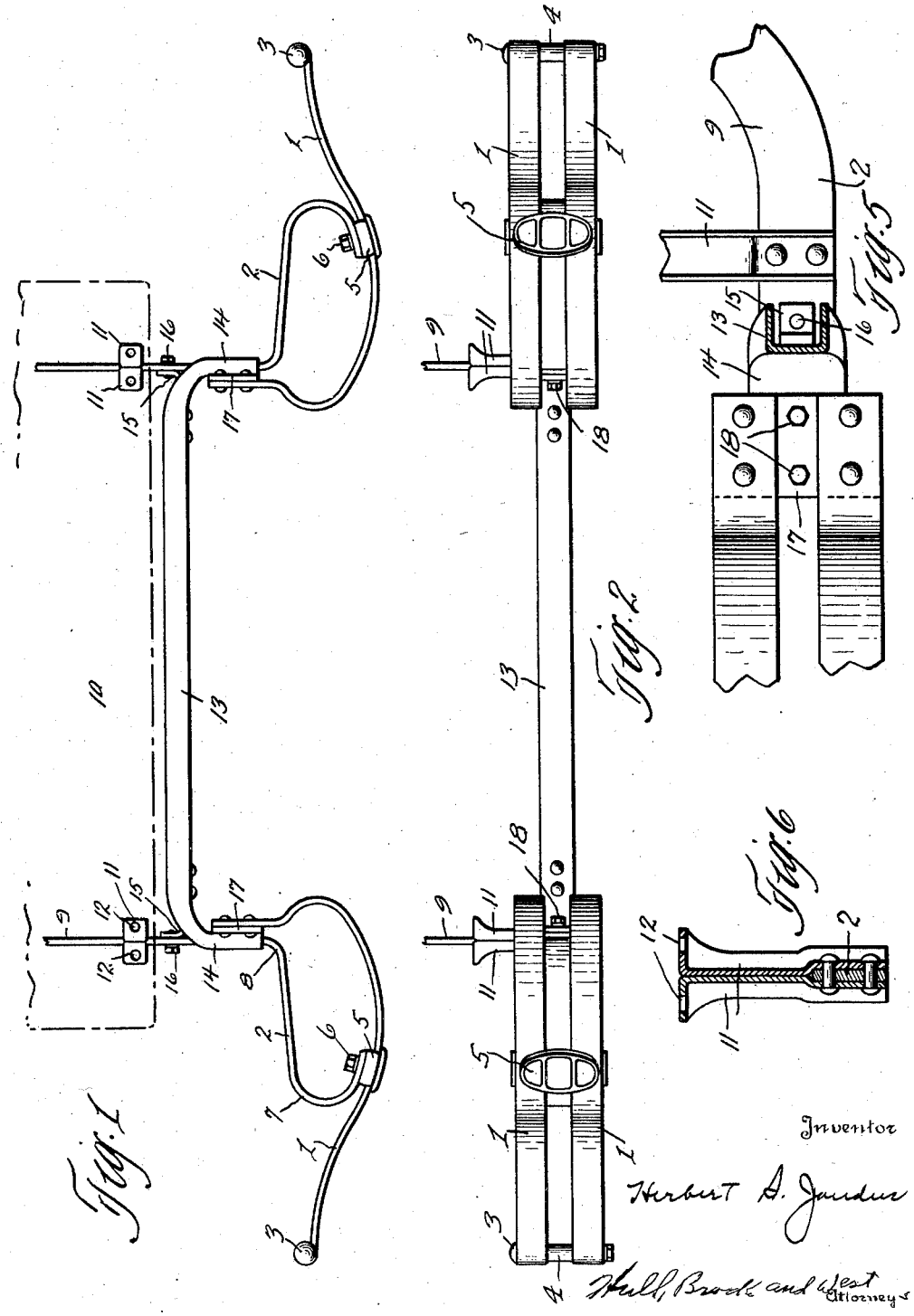

1,763,587

UNITED STATES PATENT OFFICE

HERBERT S. JANDUS, OF DETROIT, MICHIGAN, ASSIGNOR TO GENERAL SPRING BUMPER CORPORATION, OF DETROIT, MICHIGAN, A CORPORATION OF MICHIGAN

BUMPER

Application filed March 25, 1929. Serial No. 349,545.

This invention relates to vehicle bumpers and more particularly to the provision of suitable means for bracing the members serving to support the impact section or sections of the bumper.

In supporting a bumper at the rear of a vehicle, it is often necessary to attach the support arms to the frame members at points considerably forward of the rear of the vehicle body. These support arms are usually connected to the rear portion of the vehicle by means of hangers, which may be screwed or bolted thereto. With such a construction it is found advisable to brace the support arms in order to prevent the vibration of the vehicle or the force of an impact from pulling the screws or bolts from the vehicle body. An object of the invention is to provide an improved means for bracing the support arms or members of a bumper. Another object of the invention is to produce a bumper construction of greater strength and rigidity. Further and more or less limited objects will be apparent from the following description, the drawings, and from the use of articles covered by the claims.

In describing the invention, reference will be had to the drawings in which Fig. 1 represents a plan view of a bumper utilizing the invention; Fig. 2 shows a rear elevation of the bumper shown in Fig. 1; Fig. 3 is a detail plan view of the central portion of the bumper construction with a portion at the left side shown in section; Fig. 4 is a section taken on line 4—4 of Fig. 3; Fig. 5 is a section taken on line 5—5 of Fig. 3; Fig. 6 is a section taken on line 6—6 of Fig. 3.

In describing the invention it will be assumed that the bumper is connected to the rear of a vehicle and the terms "front" and "rear" will be used in relation to such arrangement, but it is not intended thereby to limit the use of the invention to any particular position in relation to the vehicle.

The invention is shown in the drawings as utilized in a bumper made up of spaced impact sections, each of which includes a pair of impact bars 1, 1 and a support arm 2. The impact bars 1, 1 are connected together at their outer ends by means of a bolt 3 passing through eyes formed at the ends of the bars and a tubular spacer 4 positioned therebetween. The support arm 2 is connected to the impact bars 1, 1 intermediate their ends by means of a clamp 5 retained by a bolt passing through the end of the support arm 2 and clamped by means of a nut 6. The support arm 2 is bent around to form a short loop at 7 and is bent rearwardly at 8 and upwardly at 9 for attachment, at a point farther forward, to the vehicle frame (not shown). Each support arm is hung from the vehicle body 10 by means of the brackets 11, 11 riveted or otherwise fastened to the arm 2 at their lower ends and having apertures 12, 12 in their upper portions for screws or bolts (not shown) by which the brackets may be connected to the vehicle body. The support arms 2, 2 are connected to each other by means of the channel-shaped brace 13 having its ends curved rearwardly at 14, 14 and having its web of increased width at 14, 14 in order to accommodate the arm 2, as more clearly shown in Fig. 4. A short bracket 15 is riveted or otherwise rigidly connected to the web at each end of the channel-shaped brace 13 and is curved forwardly for connection to the support bar 2 by means of the bolt 16.

The inner ends of the impact bars 1, 1 are curved around to form a short loop and then forwardly for attachment to the support means. Each of these bars is riveted or otherwise connected to a plate 17 which in turn is bolted to the rearwardly curved ends of the channel-shaped brace 13 by means of the bolts 18, 18 passing through the plate 17, the web of the brace 13, and the rearwardly extending portion of the support arm 2.

The brace 13 may be rolled to produce the channel section with the rearwardly curved ends flared a sufficient amount to receive the bar 2. By this means there is provided a brace having increased rigidity at its middle portion, because of the increased thickness of the flanges, and providing suitable seats for the support arms 2, 2 at the rearwardly curved ends.

The bracket 13 has been described as applied to a bumper having spaced impact sections, but it is apparent that it may be readily applied to bumpers having a continuous impact section across the vehicle. It is furthermore apparent that this brace may be applied to bumpers of different construction and configuration.

Having thus described my invention, what I claim is:

1. The combination with spaced impact sections and support members therefor, of a channel brace having its end portions curved to form seats for the said support members, and means for clamping said support members to said brace.

2. The combination, with spaced impact sections and support members therefor, of a channel-shaped brace having its end portions curved to form seats for the said support members, brackets extending from the inner web of said channel and curved in opposite directions for attachment to said support members, and means for clamping said support members to said brace and bracket.

3. The combination, with support members for a vehicle bumper, of a channel-shaped brace extending between said support members, said brace having its ends flared to provide seats for the said support members, and means for clamping the support members to the flared portions of the brace.

4. The combination, with support members for a vehicle bumper, of a channel-shaped brace extending between said support members and having its ends flared to provide seats for the said support members, brackets extending from the web of said brace and attached to said support members at points spaced from said seats, and means for clamping the support members to the flared portions of the brace.

5. The combination, with a pair of impact sections and a support member for each section secured to a vehicle at a point substantially opposite the inner end of the impact section, of means for bracing said impact sections comprising a channel-shaped member having its ends bent toward said impact section for connection to the support members therefor, and means for clamping said support members to said brace.

6. The combination, with a pair of impact sections and a support member for each section secured to a vehicle at a point substantially opposite the inner end of the impact section, of means for bracing said impact section comprising a channel-shaped member having its ends bent toward said impact section for connection to the support members therefor, brackets connected to said channel-shaped member and curved away from said impact section for attachment to said support members, and means for clamping said support members to said channel-shaped member.

7. The combination, with a pair of impact sections each supported from a vehicle at a point substantially opposite the inner end of the impact section, of means for bracing said impact section comprising a channel-shaped member having its ends flared and bent toward said impact section to provide seats for the support members therefor, and means for clamping said support members to said channel-shaped brace.

8. A brace for connecting spaced impact sections each having a support member, said brace comprising a channel-shaped member having its ends bent substantially at a right angle for connection to the support members for said impact sections.

9. A brace for connecting spaced impact sections each having a support arm, said brace comprising a channel-shaped member having its end portions bent toward said impact sections for connection to the support arms therefor.

10. A brace for connecting spaced support members for a bumper structure, said brace comprising a channel-shaped member having its end portions flared and bent to provide a seat for said support members.

11. A brace for connecting spaced support members for a bumper structure, said brace comprising a channel-shaped member having its end portions flared and bent to provide a seat for said support members, and a bracket connected to the channel member and bent oppositely for connection to said support members.

In testimony whereof, I hereunto affix my signature.

HERBERT S. JANDUS.